3,737,288
ANTIFOULING DEFLECTOR IN OLEFIN
POLYMERIZATION REACTORS
Jack M. Hochman, Boonton, N.J., assignor to Esso
Research and Engineering Company
Filed June 18, 1971, Ser. No. 154,525
Int. Cl. C08f 1/98
U.S. Cl. 23—285          6 Claims

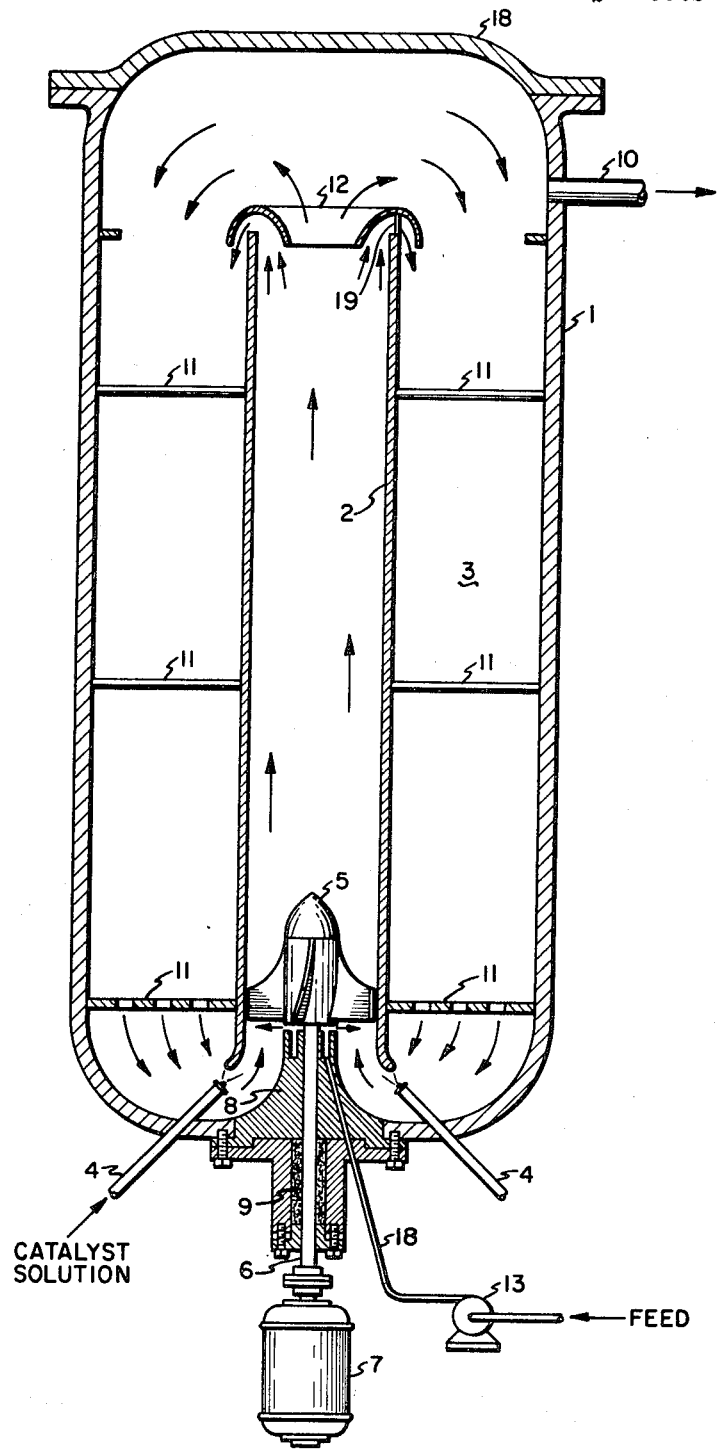
Fig. I

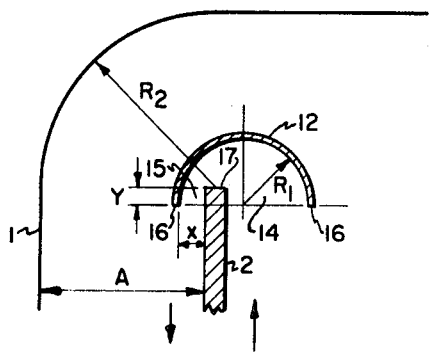
Fig. II (a)
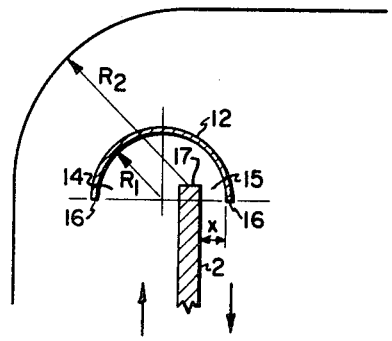
Fig. II (b)
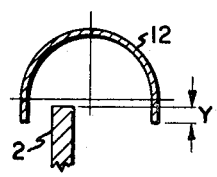
Fig. III (a)
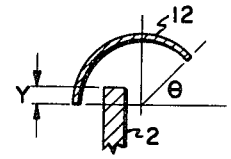
Fig. III (b)
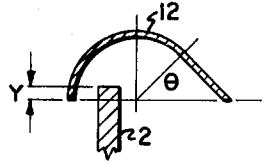
Fig. III (c)
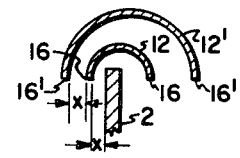
Fig. III (d)
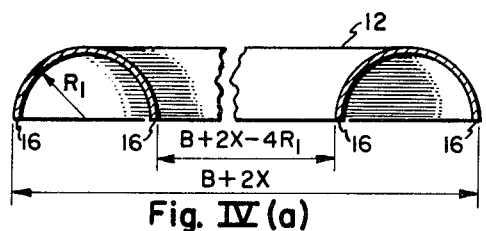
Fig. IV (a)
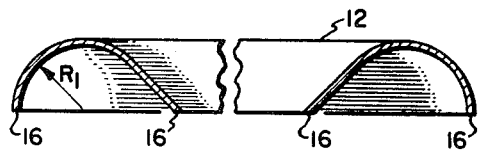
Fig. IV (b)
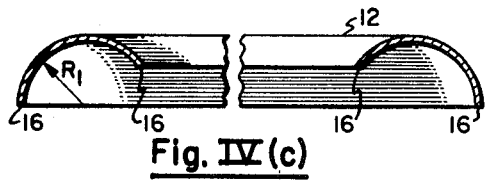
Fig. IV (c)
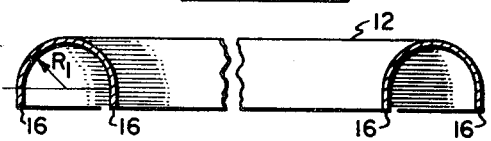
Fig. IV (d)
Jack M. Hochman INVENTOR United States Patent Office 3,737,288
Patented June 5, 1973

ABSTRACT OF THE DISCLOSURE

A semicircular flow deflector is mounted at the discharge end of a draft tube-type polymerization reactor thereby directing the flow in a turbulent stream along the outer wall of the draft tube to prevent fouling by the buildup of polymer product on the draft tube.

BACKGROUND OF THE INVENTION

It is known to prepare various polyolefins, e.g. polyethylene, in autoclave-type reactors using high degrees of agitation to prepare uniform products. See, for example U.S. Pat. 2,897,183.

Attempts have been made to utilize various types of reactors, termed "draft tube reactors" for the preparation of polyolefins. These draft tube reactors are described in U.S. Pats. 2,577,856 and 2,999,084 incorporated herein by reference.

Difficulty has been encountered in utilizing prior art draft tube reactors for the polymerization of olefins such as ethylene, propylene and the like as a result of fouling of the draft tube ends by polymer.

Various reactors of modified design have been developed having incorporated therein so-called "splitter members" mounted at the ends of the draft tube. The purpose of the splitter members is to divide the stream and to prevent concentration of heavy solid particles during reversal of the flow of the stream and to reduce turbulence at the turns. They are said to also reduce abrasion caused by turbulence. See, for example, U.S. Pat. 2,418,857 incorporated herein by reference.

SUMMARY OF THE INVENTION

It has now been found that fouling in a draft tube-type reactor can be substantially reduced by the use of at least one flow deflector mounted at the outlet to the draft tube. In a preferred embodiment, a single flow deflector is used having a circular cross-section of a radius equal to the annular radius. The flow deflector is spacially oriented so that the distance between the flow deflector and the outer draft tube wall is preferably about ⅛ the annular radius. The deflector extends downward beyond the end of the draft tube wall at least ⅙ of the annular radius. By means of the deflector a highly-turbulent zone is generated near the end of the draft tube thereby preventing fouling.

BRIEF DESCRIPTION OF THE DRAWINGS

FIG. 1 is a schematic side elevation view in section of the draft tube polymerization reactor.

FIG. 2 is a fragmentary side elevation view in section showing the relative dimensions of the reactor configuration.

FIG. 3 shows various deflector configurations.

FIG. 4 is a cross-sectional view of various deflector configurations.

DETAILED DESCRIPTION

This invention relates to an improved polymerization reactor of the draft tube type. More particularly the invention relates to modification of reactor internals to prevent fouling by polymer buildup at the end of the draft tube.

Although the apparatus of this invention is described with reference to polymerization of an olefin such as ethylene, the apparatus may be used for polymerization of any polymerizable monomers such as ethylene, propylene, isoolefins, and isoolefin-diolefin blends.

Turning now to FIG. 1 there is disclosed a reactor comprising an elongated housing 1, having mounted therein a draft tube 2. Agitation is provided by means of an axial flow pump 5, which is preferably of the propeller (i.e. impeller type) positioned in the lower portion of the draft tube 2, and supported therein by means of a shaft 6, interconnected with a prime mover 7, of any suitable construction. A suitable housing is provided for the shaft 6, such as a housing 8, containing a seal such as annular packing 9. Furthermore, the impeller may be so operated that flow will be directed upward through the annulus 3, and return by down flow through the draft tube 2, to the impeller 5.

Circulation in the reactor is upward through the center of the draft tube and downward through the annulus 3, formed by the draft tube 2, and the elongate housing 1. The monomer feed is introduced either neat or in solution through a feed line 18, by means of a monomer pump 13, into the inlet side of the axial flow pump 5. The catalyst may be introduced directly with the feed or through a separate catalyst solution feed line 4. The catalyst solution may comprise the catalyst dissolved in the monomer feed or any other suitable catalyst. The solution of olefinic monomers is continuously introduced into the shell 1, whereby the olefinic monomers are polymerized to form high molecular weight interpolymers. A portion of the monomer-polymer mixture is continuously withdrawn from the shell 1, by way of a discharge line 10, for recovery of the polymer.

The flow deflector 12 is a trough-like member having a circular cross-section mounted at the discharge end of the draft tube, supported by structural members 19.

Although the reactor is shown in FIG. 1 in a vertical position with the impeller at the bottom of the reactor and flow upward through the draft tube, it is not necessary that the reactor be mounted in the aforedescribed upright position. In view of the intense agitation and circulation throughout the reactor, the effect of gravity is negligible. Hence, the reactor may be used in horizontal or upright position and the impeller may be located at the top or the bottom.

For the purposes of the specification and claims, the term "downstream end of the draft tube" means the outlet end relative to flow away from the impeller, where flow is away from the impeller through the annulus 3. "The downstream end of the draft" is the outlet end of the annulus enclosed by the draft tube. Since the flow is with reference to the impeller the same end of the draft tube is the downstream end of the draft tube regardless of the direction of flow.

Turning now to FIG. 2(a), the dimensions and spacial orientation of the deflector 12 is shown in its critical aspects. The annular radius A is one-half the difference between the diameter of the housing 1, and the draft tube 2. The radius of the deflector $R_1$ is about $A/2$ to about $A/4$, preferably $A/3$. The outlet end of the draft tube is spacially oriented so as to be a distance $R_2$ of about A from the end of the reactor; preferably the configuration of the reactor corners is circular having a radius $R_2$. The portion of the deflector 14, which is within the draft tube is termed the "inlet" section of the deflector, while the portion of the deflector which is external to the draft tube 15 is termed the "outlet" portion of the deflector. Flow is upward through the draft tube, through the inlet and out of the outlet along the outer wall of the draft tube 12. The outlet dimension "X" is critical and may vary between $A/8$ to $A/12$. Preferably X is $A/8$. The edges of the deflector 16 should extend down below the end of the draft tube a distance Y, of at least $A/6$.

FIG. 2(b) shows the corresponding structure where the flow is upward through the annulus and returns down through draft tube, all the corresponding parts having the same nomenclature. However, here the "inlet" 14 to the deflector is the portion external to the draft tubes and the outlet 15 is within the draft tube. Hence flow is upward into the inlet 14 and out through the outlet 15, along the inner wall of the draft time. In both cases it is the outlet dimension which is critical.

As used in the specification and claims, the "outer edge of the deflector" is the edge 16, which together with the draft tube forms the deflector outlet.

It is obvious that more than one deflector may be used. Where a multiplicity of deflectors is used, each is preferably concentric with the other. Where more than one deflector is used, the outer edge of those deflectors other than that closest to the draft tube is the edge 16, which, together with its next inner deflect, form the outlet for the deflector in question.

Although the cross-section of the deflector is described as being semicircular, it may also have the configuration as shown in FIGS. 3(b) and 3(c). For example, the inlet edge of the draft tube may be cut back a distance through an angle theta $(\theta)$, wherein theta is preferably less than 45°. In a preferred embodiment where a circular section theta has been cut off, the deflector is extended tangentially as shown in FIG. 3(c) so that it extends beyond the end 17 of the draft tube a distance Y, of at least $A/6$.

The term "semicircular cross-section" as used in the specification and claims encompasses the configurations described in FIGS. 3(a), (b), and (c), notwithstanding the fact that the latter two configurations are not truly semicircular. The term "draft tube reactor" as used in the specification and claims means a polymerization reactor of the type described herein and more fully described in U.S. Pats. 2,577,856 and 2,999,084 incorporated herein by reference. The term "annular radius" as used in the specification and claims means ½ of the difference between the outer diameter of the draft tube 2, and inner diameter of the reactor housing 1.

Where a multiplicity of deflectors is used, the critical dimension is the distance between the outer edges of the subsequent deflector. Referring now to FIG. 3(d), a first deflector 12 is shown with its outer edge a distance X from the draft tube 2. A subsequent deflector 12′ is spacially oriented concentric with the first deflector 12, having its outer edge 16′ a distance X from the outer edge of the first deflector 16. "X" is as previously defined.

Although the draft tube is illustrated as being supported by structural members which are either perforated plates or struts, this invention is in no way limited by the manner in which the draft tube or other elements of the reactor are mechanically suspended within the polymerization vessel.

The figures show the center of the circular section of the deflector being located at a distance Y below the end 14 of the draft tube 2. Although this is a preferred embodiment, the center of the circular section may be located in any position provided that the limitation of the distance X is maintained. The deflector, however, must be extended a distance Y below the ends 17 of the draft tube 2. Where the center of the deflector is located at some other position other than a distance Y below the end 17 of the draft tube 2, the outer edge 16 of the deflector must be extended tangentially and concentric with the draft tube 2, as shown in FIG. 3(a).

In its preferred embodiment, the difference $R_2-R_1$ is preferably $2A/3$. In any event the distance $R_2-R_1$ is preferably not less than $A/2$; that is, ½ the annular radius. In its preferred embodiment, however, the center of the deflector is located a distance $A/6$ below the end 17 of the draft tube 2, and in that event the distance $R_2-R_1$ is preferably $2A/3$. Although the deflector may be extended a distance greater than $A/6$, there is no apparent advantage in so doing. Pressure limitations determine the maximum length of the extension.

The term "reactor head" as used in the specification and claims means the end of the reactor housing 18, downstream of the draft tube. Although the deflector has been described as trough-like, those skilled in the art will recognize that the deflector is of toroidal configuration wherein the plane closed curve from which it is generated has the configuration of the semicircular cross-sections shown in FIG. 2. The term "toroidal deflector" as used in the specification and claims means the trough-like deflector of this invention, the preferred embodiments of which are illustrated in FIG. 3.

Referring now to FIG. 4, "B" represents the outer diameter of the draft tube 2; therefore, the major diameter of the toroidal deflector is $B+2X$. Where the cross-section of the toroidal deflector is semicircular, the minor diameter of the toroidal deflector is $B+2X-4R_1$ wherein $R_1$ is the radius of the semicircular cross-section.

What is claimed is:

1. In a draft tube-type polymerization reactor wherein the draft tube extends to a distance of about the annular radius of the reactor head, the improvement which comprises mounting at the downstream end of the draft tube a flow deflector of toroidal construction having a circular cross-sectional radius of about ⅓ to about ⅙ of the annular radius, said toroidal deflector being spacially oriented such that the outer edge of the deflector is a distance of about ⅛ to about 1/12 of the annular radius from the draft tube, said outer edge of the toroidal deflector extending a distance of at least ⅙ the annular radius beyond the end of the draft tube.

2. The reactor of claim 1 wherein the cross-sectional radius of the deflector is about ⅓ the annular radius.

3. The reactor of claim 1 wherein the outer edge of the deflector is a distance of about ⅛ the annular radius from the draft tube.

4. The reactor of claim 1 wherein the center of the cross section of deflector is spacially oriented a distance ⅙ the annular radius from the downstream end of the draft tube towards the impeller.

5. In a draft tube-type polymerization reactor wherein the draft tube extends to a distance of about the annular radius of the reactor head, the improvement which comprises mounting at the downstream end of the draft tube a multiplicity of flow deflectors of toroidal construction; said deflectors being spacially oriented to be concentric with one another; said deflectors comprising (a) a first deflector having a circular cross-sectional radius of about ⅓ to about ⅙ the annular radius and being spacially oriented such that the outer edge of said first deflector is a distance of about ⅛ to 1/12 the annular radius for the draft tube; (b) at least one subsequent deflector concentric with said first deflector and being spacially oriented such that the outer edge of said subsequent deflector is a distance of about ⅛ to about 1/12 the annular radius from previous deflector; the outer edges of the deflectors extending a distance of at least ⅙ the annular radius beyond the end of the draft tube.

6. The reactor of claim 5 wherein there are two deflectors comprising (1) a first deflector having a cross-sectional radius of about ⅓ the annular radius and being spacially oriented such that the outer edge of said first deflector being a distance of about ⅙ the annular radius from the draft tube and (2) a second deflector concentric with said first deflector and being spacially oriented such that the outer edge of the second deflector is a distance of about ⅙ the annular radius from the outer edge of the first deflector.

References Cited
UNITED STATES PATENTS

| | | | |
|---|---|---|---|
| 2,474,592 | 6/1949 | Palmer | 23—285 X |
| 2,443,817 | 6/1948 | Draeger et al. | 23—288 E X |
| 2,418,857 | 4/1947 | Stratford et al. | 23—288 E X |

JAMES H. TAYMAN, JR., Primary Examiner

U.S. Cl. X.R.

23—288 E, 288 S; 259—97.95; 260—94.9